Figure 1:
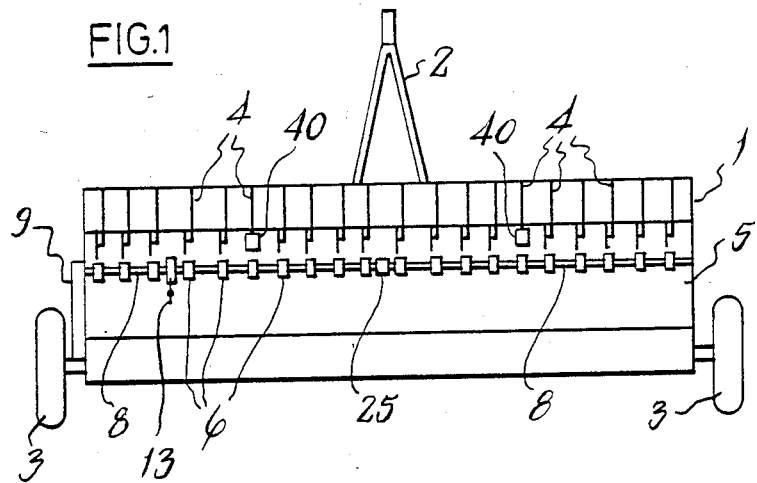

United States Patent [19]

Bailey

[11] Patent Number: 4,587,909
[45] Date of Patent: May 13, 1986

[54] AGRICULTURAL DRILLS

[75] Inventor: Alfred J. Bailey, Coventry, United Kingdom

[73] Assignee: Massey-Ferguson Services N.V., Curacao, Netherlands Antilles

[21] Appl. No.: 657,917

[22] Filed: Oct. 5, 1984

Related U.S. Application Data

[63] Continuation-in-part of Ser. No. 441,599, filed as PCT GB82/00063, on Feb. 24, 1982, published as WO82/02993 on Sep. 16, 1982, § 102(e) date Nov. 1, 1982, abandoned.

[30] Foreign Application Priority Data

Mar. 6, 1981 [GB] United Kingdom ............... 8107194
Feb. 24, 1982 [WO] PCT Int'l Appl. ... PCT/GB82/00063

[51] Int. Cl.[4] ................................. A01C 5/00
[52] U.S. Cl. ............................. 111/67; 192/23
[58] Field of Search ............ 111/1, 35, 53–59, 111/67, 85, 25, 28, 33, 66; 403/349; 74/543–548, 550; 172/44, 125, 311, 456, 776; 222/611, 624, 486; 239/172; 192/48.8, 48.9, 99.5, 22, 23, 67 P

[56] References Cited

U.S. PATENT DOCUMENTS

| | | | |
|---|---|---|---|
| 707,733 | 8/1902 | Talbert | 111/57 |
| 773,739 | 11/1904 | Highsmith | 111/67 |
| 1,176,130 | 3/1916 | Burgess | 192/23 |
| 1,215,478 | 2/1917 | Burgess | 192/23 |
| 1,583,332 | 5/1926 | Behrsing et al. | 74/550 |
| 1,611,931 | 12/1926 | Marshall | 74/550 |
| 1,626,012 | 4/1927 | Reuse | 111/34 |
| 2,373,920 | 4/1945 | Silver | 111/59 |
| 2,730,876 | 1/1956 | Russell | 464/113 |
| 2,881,883 | 4/1959 | Schnell | 192/23 |
| 2,937,535 | 5/1960 | Wezner | 74/10.41 |
| 3,174,358 | 3/1965 | Wachta | 74/548 |
| 4,289,256 | 9/1981 | Bailey | 111/25 |
| 4,359,952 | 11/1982 | Gesior et al. | 192/23 X |
| 4,516,670 | 5/1985 | Sorensen | 111/67 |

FOREIGN PATENT DOCUMENTS

| | | | |
|---|---|---|---|
| 660158 | 8/1965 | Belgium . | |
| 345079 | 12/1921 | Fed. Rep. of Germany . | |
| 2924625 | 1/1981 | Fed. Rep. of Germany . | |
| 580774 | 9/1924 | France | 74/550 |
| 1330990 | 5/1963 | France . | |
| 1496227 | 9/1967 | France | 403/349 |
| 2360791 | 3/1978 | France . | |
| 151438 | 9/1955 | Sweden | 74/548 |
| 291195 | 5/1928 | United Kingdom . | |
| 1098467 | 1/1968 | United Kingdom . | |
| 1274673 | 5/1972 | United Kingdom . | |
| 2034562 | 6/1980 | United Kingdom . | |
| 458665 | 3/1975 | U.S.S.R. | 403/349 |

Primary Examiner—James R. Feyrer
Attorney, Agent, or Firm—Robert L. Farris

[57] ABSTRACT

An agricultural drill having a plurality of seed dispensing units 6 that are driven through rotary shaft means 8 that extends across the width of the drill and is driven by a drive mechanism 9 at one end, said shaft means 8 comprising two coaxial shafts that each drive the seed dispensing units 6 associated with half the width of the drill and that are connected together by a quick release coupling 25 that couples the shafts together for rotation and can be released to stop rotation of that shaft remote from the drive mechanism 9. The quick release coupling 25 comprises a bayonet type coupling in which a radially projecting pin 28 associated with one shaft 8 engages in an axially and circumferentially extending slot 27 associated with the other shaft 8, said slot 27 being shaped so that it cooperates with the pin 28 and produces a wedge action that urges the two shafts 8 into axial abutting engagement when they are driven.

8 Claims, 8 Drawing Figures

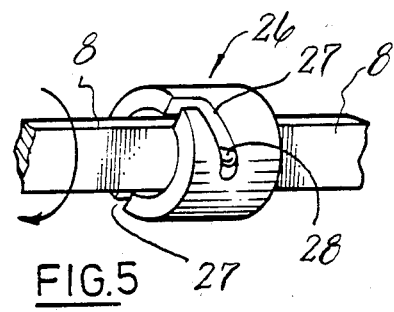
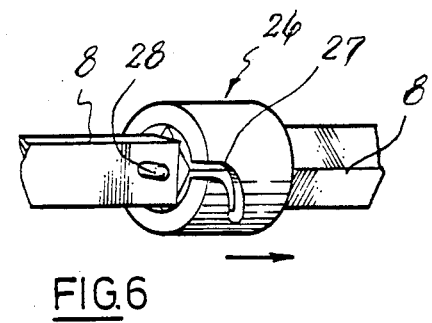
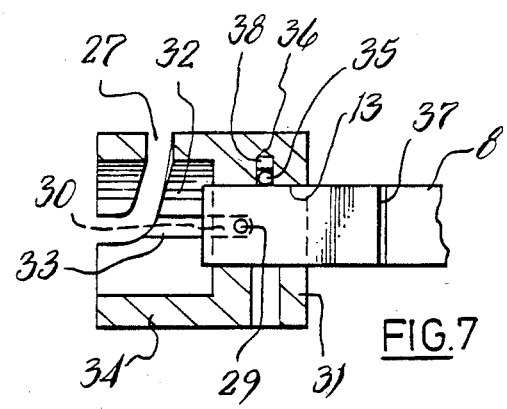
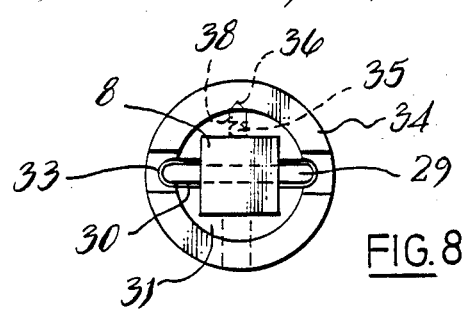

AGRICULTURAL DRILLS

This is a continuation-in-part of copending application Ser. No. 441,599 Filed as PCT GB 82/00063, on Feb. 24, 1982, published as WO 82/02993 Sep. 16, 1982, § 102(e) date Nov. 1st, 1982 now abandoned.

TECHNICAL FIELD

This invention relates to agricultural drills.

BACKGROUND ART

It is now common practice to provide agricultural drills with tramlining devices that operate to leave selected rows unsown in selected bouts so as to produce tracks or tramlines in the subsequent crop for the passage of a vehicle when treating the crop such as by spreading or spraying fertilizer or insecticide.

Generally, the subsequent crop treatment covers two or more drill bouts in one pass of the treatment vehicle, and the treated width conveniently coincides with the edges of the drill bouts. However, a situation can arise in which the treated width does not coincide with the edges of the drill bouts and half of the first drill bout will not be treated by the first pass of the treatment vehicle. An agricultural drill has therefore been proposed in West German Patent Specification No. DE-2924625 to allow half a bout width to be sown. Said drill has a plurality of seed dispensing units that are spaced across the width of the drill and are driven by a drive mechanism comprising two coaxial drive shafts each extending over one half the width of the drill and each being selectively driveable so as to sow half a width either side of the centre line of a drill bout or to sow a full width bout. Each drive shaft is driven through a corresponding clutch mechanism at the centre of the drill comprising a first gearwheel on the shaft, a second gearwheel on a pivoted arm that is operated to engage or disengage said first and second gearwheels, and a third gearwheel in constant mesh with the second gearwheel and which is carried on an input drive shaft coaxial with the pivoted arms. Thus, two clutch mechanisms are provided to control drive to the adjacent inner ends of both seed unit drive shafts, and an input drive shaft transfers drive from the side of the drill to these clutches.

Agricultural drills are also known, for example as shown in U.S. Pat. No. 3,620,419, in which a plurality of seed dispensing units are driven by a common drive shaft that is axially adjustable to vary the feed rate of the dispensing units.

An object of the present invention is to provide an agricultural drill having a drive mechanism for the seed dispensing units which is adapted to allow either a full or half a bout width to be sown but which is simpler than the known drive mechanism of this type employing two coaxial drive shafts each associated with a respective half of the drill width. A further object is to provide that said drive mechanism is adapted so that it allows adjustment of the feed rate of the seed dispensing units through axial adjustment of said drive shafts driving said units.

SUMMARY OF THE INVENTION

This object is achieved according to the invention by providing an agricultural drill having a plurality of seed dispensing units that are spaced across the width of the drill, two coaxial drive shafts each extending across a respective half of the width of the drill and each being in driving engagement with the seed dispensing units associated with said respective half of the width of the drill, and a drive mechanism at one end of the drill that serves to drive one or both drive shafts characterised in that the drive mechanism is adapted for driving engagement with that end of one drive shaft nearest the drive mechanism and in that a quick release drive coupling is provided between the two drive shafts comprising a radially projecting pin associated with one shaft and a slotted member associated with the other shaft the pin being engageable in an axially and circumferentially extending slot formed in said slotted member so that it cooperates with the pin to produce a wedge action that urges the two shafts axially into abutting engagement when they are driven.

The drill can therefore be used to sow half a bout along the edge of a field by simply releasing the coupling between the two halves of the seed dispenser drive shaft. This coupling is then reconnected so that the drill sows full width bouts thereafter. The advantage of this coupling is that it is relatively simple and makes use of the angular reaction force between the two shafts to maintain them in axial engagement. This is an important feature if the drive shafts are axially adjustable to vary the feed rate of the seed dispensing units, because any variation in the axial spacing of the drive shafts will produce differences between the feed rates of the seed dispensing units associated with the two drive shafts.

BRIEF OF THE DRAWINGS

Figure 4:
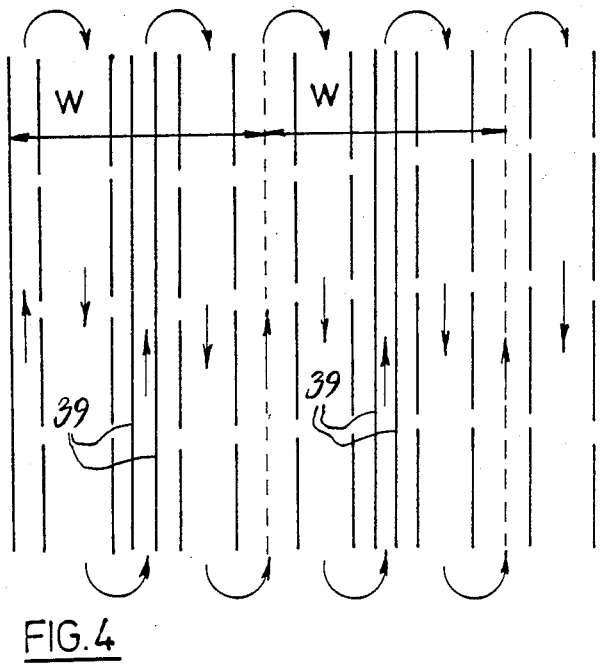
Figure 2:
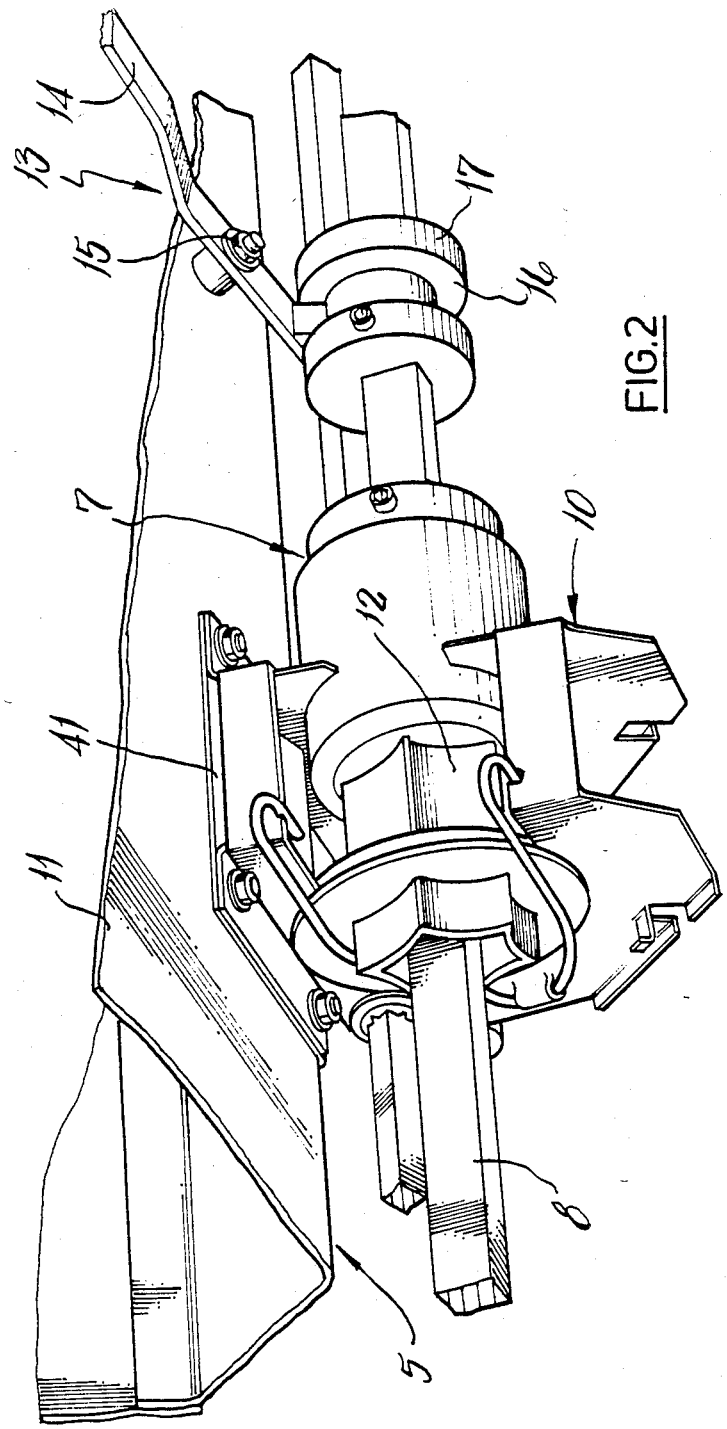
Figure 3:
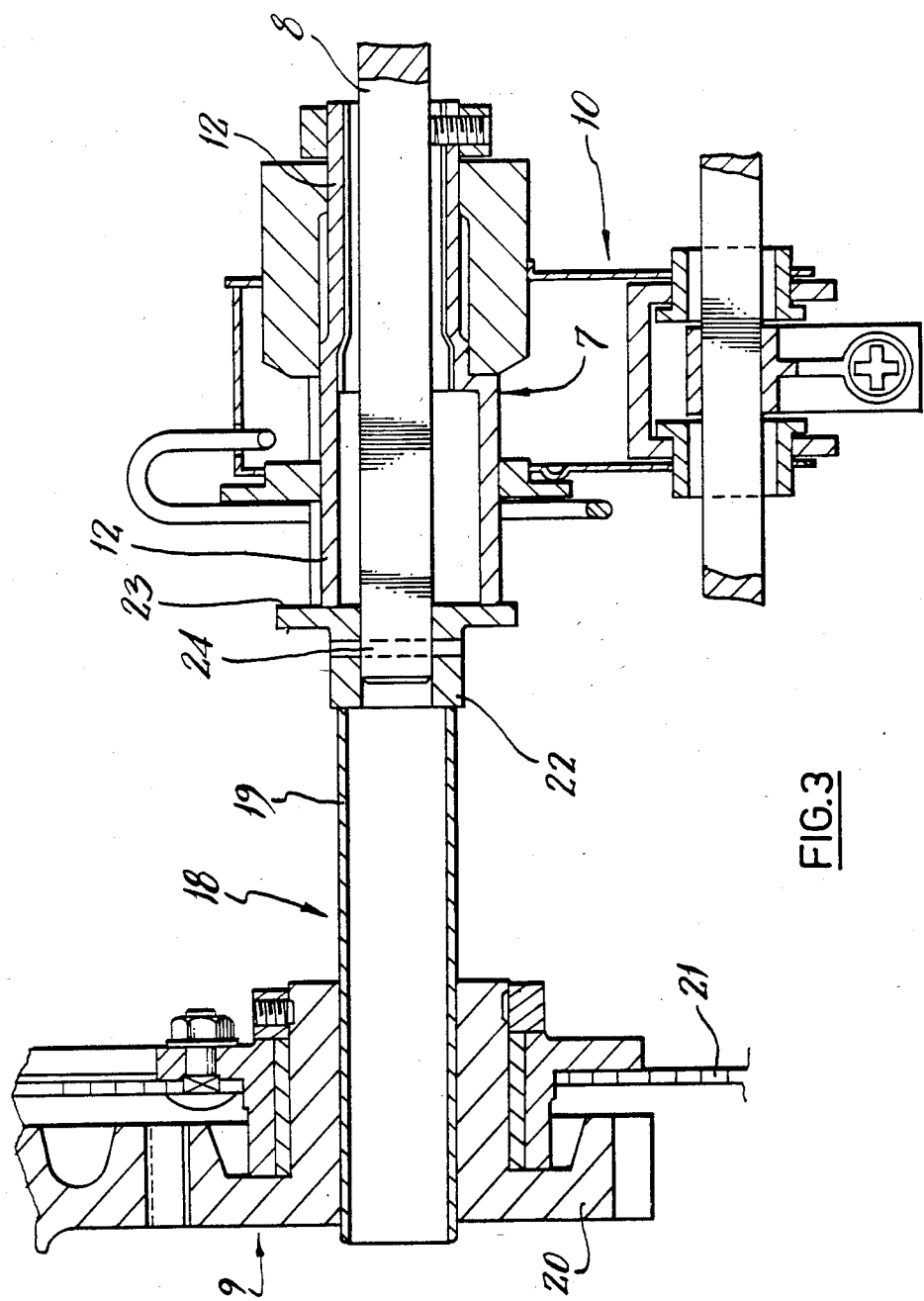

The invention will now be described by way of example with reference to the accompanying drawings in which:

FIG. 1 is a schematic plan view of an agricultural drill according to the invention, FIG. 2 is a perspective view of a seed dispensing unit used in the drill of FIG. 1, FIG. 3 is an axial section through the seed dispensing unit at the extreme left-hand end of the drill of FIG. 1, showing the connection to a drive mechanism, FIG. 4 is a diagram illustrating tramlines in a series of bouts using the drill of FIG. 1, FIG. 5 shows a quick release shaft coupling used in the seed dispenser drive shaft of the drill of FIG. 1, the coupling being shown connected, FIG. 6 shows the same coupling as FIG. 3 but in the released or uncoupled state, FIG. 7 is an axial section through the socket member of the coupling of FIGS. 5 and 6 and FIG. 8 is an end elevation of the socket member of FIG. 7.

BEST MODE OF CARRYING OUT THE INVENTION

The illustrated drill comprises a chassis 1, a tractor drawbar 2 and a pair of landwheels 3. A plurality of coulters 4 are pivotally connected to the front beam of the chassis so as to trail therefrom, and a hydraulically-operated actuation system (not shown) is provided to force the coulters into work to form seed furrows.

A seed hopper 5 is mounted on the chassis across its width and a plurality of individual seed dispensing units 6 are mounted on the underside of the hopper 5 so as to dispense seed that is delivered to a furrow produced by a respective coulter 4. The seed dispensing units, as shown in FIGS. 2 and 3, each comprising a rotary metering member 7 that is keyed on a drive shaft 8 that is common to all of the units and is rotatably driven at the left-hand end by a drive mechanism 9 coupled to the adjacent landwheel 3.

The metering member 7 is rotatably mounted in the side walls of a housing 10 that opens upwards and communicates with the hopper 5 through an opening in the bottom wall 11 of the hopper. Seed entering the housing from the hopper is dispensed from the housing to the respective coulter by the action of a fluted roll 12 that forms part of the metering member 7. The rate at which the seed is dispensed is varied by axial adjustment of the metering member 7 within the housing so as to vary the effective width of the fluted roll 12 within the housing. An adjustment mechanism 13 controls the axial setting of the drive shaft 8 and thereby controls the axial setting of all the metering members simultaneously so that the feed rate for all the seed dispensing units 6 is the same. As shown in FIG. 2, the adjustment mechanism 13 comprises a lever 14 connected in a pivot 15 to the bottom wall 11 of the hopper and engaging a channel 16 in a cylindrical block 17 keyed to the drive shaft 8. Axial movement of the drive shaft 8 relative to the drive mechanism 9 is accomodated by a sliding connection 18 (FIG. 3) comprising a rectangular tubular sleeve 19 that is axially slidable in a drive gear 20 of the drive mechanism journalled in a plate 21 connected to the end of the hopper 5. The sleeve 19 carries a boss 22 at its inner end that mates with the drive shaft 8 and has an end face 23 which abuts the end of the adjacent fluted roll 12. A pin 24 holds the drive shaft 8 and boss 22 in axial engagement.

The seed dispensing units and the drive mechanism for them are described in more detail in U.S. Pat. No. 3,260,419 which is incorporated herein by reference.

In the known seed dispensing mechanism, there is a one-piece drive shaft that extends the full width of the drill so that all of the dispensing units are driven together at all times. However, the drive shaft 8 in the illustrated embodiment of the invention is formed in two coaxial sections that are connected at the centre of the drill by a quick release coupling 25 that enables the two to be uncoupled so that only one is driven by the drive mechanism 9, thereby allowing half a bout to be sown.

The quick release coupling 25 is illustrated in FIGS. 5 to 8 and comprises a socket member 26 that is mounted on the end of the right-hand section of shaft 8 and is adapted to receive the adjacent end of the left-hand section of shaft 8. The socket member 26 is formed with two curved slots 27 in its side wall diametrically opposite one another. These slots 27 open outwards at the free edge of the side wall and curve inwards circumferentially of the side wall in the sense of rotation of the shaft when being driven, this direction being indicated by an arrow in FIG. 5.

A pin 28 is inserted diametrically through the left-hand section of shaft 8 near its free end, and the projecting ends of this pin 28 cooperate with the slots 27 in the manner of a bayonet connection, as shown in FIG. 5. Further, because of the curved nature of the slots 27, the rotary driving action of the left-hand section of the shaft produces a wedging action of the pin against the sides of the slots 27 and thereby serves to pull the two sections of the shaft axially into end-to-end abutting engagement. The pin 28 does not engage the end of slots 27 in order to ensure that the wedging action persists when the two sections of the drive shaft 8 abut end-to-end.

The importance of this feature arises from the fact that the shaft 8 is movable axially so as to move the rotary metering units within the seed dispensing units and thereby adjust the rate at which they dispense seed. Thus, the two sections of the shaft 8 need to be kept in a fixed axial relationship relative to one another if the feed rate adjustments of the seed dispensing units associated with each section are not to get out of step.

The socket member 26 is slidably mounted on the right-hand section of shaft 8. A pin 29 is inserted transversely through the end of the shaft 8 so that its ends project and act as a detent to retain the socket member on the shaft. The ends of the pin 29 are received in a transverse slot 30 in the base 31 of the socket member when the latter is fully extended for coupling, as shown in FIG. 7, the free end of the shaft 8 then projecting slightly into the central cavity 23 of the socket member for abutting engagement with the free end of the left-hand section of shaft 8. Grooves 33 formed longitudinally in the internal surface of the side wall 34 of the socket member accommodate the ends of the pin 29.

A spring loaded ball-bearing detent 35 is provided in a recess 36 in the base 31 of the socket member so as to engage the shaft 8 and cooperate with a transverse hole 37 in the shaft to define a retracted position (see FIG. 5) in which the socket member 26 is free of the pin 28 for uncoupling. An elastomer block 38 in recess 36 urges the ball-bearing 35 into engagement with the shaft.

In the illustrated embodiment, the seed dispenser drive mechanism 9 is shown on the left-hand side of the drill so that when the socket member 26 is retracted to uncouple the two sections of shaft 8, only the left-hand section is driven and operates the seed dispensing units 6 over the left-hand half of the drill to sow half a bout width along the left-hand side of the bout. This is illustrated in FIG. 4 for the first bout of the drill along the left-hand side of a field. The socket member 26 is then extended to engage the pin 28 in slots 27 and thereby couple the two sections of the shaft together. The second and successive bouts are then sown as full width bouts as shown in FIG. 4.

On the third bout tramlines 39 are formed by operating a tramlining mechanism that serves to cut-off the supply of seed from two of the seed dispensing units equally spaced on each side of the centre line of the bout. The tramlining mechanism is represented schematically at 40 in FIG. 1 and comprises shutters that are insertable into the channel 4 (FIG. 2) between the housing 10 and the bottom wall 11 of the hopper to cut-off the supply of seed to the housing 10. The details of the tramlining mechanism are not relevant to the present invention, but a suitable tramlining system is shown in U.S. Pat. No. 4,289,256.

The tramlining mechanism is operated again to produce tramlines 39 on the seventh bout and on each successive fourth bout thereafter. In this way, tramlines are produced down the centre of successive strips of land four bouts wide, as indicated by the lateral arrows W in FIG. 4. In particular the first strip of land down the left-hand side of the field is exactly four bouts wide because of the first bout being half a bout. Thus, a treatment vehicle such as a tractor carrying spraying equipment, can use the tramlines in spraying each four bout strip in one pass without missing or wasting spray materials down the left-hand edge of the field.

It will be appreciated that the illustated drill that forms tramlines down the centre of a bout, will need to sow a first half width bout whenever the tramlines are formed in the centre of strips that are an even number of bouts wide, but not when the tramlines are formed in the centre of strips that are an odd number of bouts wide.

The illustrated example of strips four bouts wide is a common situation produced when using a 3 metre drill together with a 12 metre sprayer.

The illustrated drill has been shown without fertiliser dispensing units, but it will be appreciated that these can be easily provided below the rear section of the hopper in the same manner as the seed dispensing units 6, and the hopper divided by an internal transverse central partition into seed and fertiliser hoppers. The fertiliser dispensing units will have a common transverse drive shaft and this will be split into two sections with a quick release coupling 25 between them in the same manner as the drive shaft 8. The two drive shafts will then be coupled and uncoupled together to sow a full width or half width bout as necessary.

I claim:

1. An agricultural drill having a plurality of seed dispensing units that are spaced across the width of the drill, two coaxial and axially adjustable drive shafts each extending across a respective half of the width of the drill and each being in driving engagement with the seed dispensing units associated with said respective half of the width of the drill, a feed rate adjustment mechanism that is operable to move the drive shafts axially thereby to adjust the feed rate of the seed dispensing units, a drive mechanism at one end of the drill that serves to selectively drive one or both drive shafts and that is adapted for driving engagement with that end of one drive shaft nearest the drive mechanism, and a quick release drive coupling provided between the two drive shafts comprising a radially projecting pin associated with one shaft and a slotted member slideable along the other shaft for connection and disconnection of said drive shafts, the pin being engageable in an axially and circumferentially extending slot formed in said slotted member so that it cooperates with the pin to produce a wedge action that urges the two shafts axially into abutting engagement when the pin is drivingly engaged with the slotted member.

2. A drill as claimed in claim 1 in which the slotted member comprises a socket member that is adapted to receive the end of said one shaft carrying the pin.

3. A drill as claimed in claim 2 in which the socket member is formed with two curved slots in its side wall that lie diametrically opposite one another and that open outwards at the free edge of the side wall and extend axially and circumferentially therefrom in the same sense, the pin extending diametrically through said one shaft so that each end is engageable in a respective slot.

4. A drill as claimed in claim 3 in which the slotted member is a socket member having a base formed with a hole through which the end of said one shaft projects to allow axially sliding movement whilst keying the socket member and shaft together.

5. A drill as claimed in claim 4 in which the socket member is retained in said shaft by a retaining pin that is inserted diametrically through the end of said shaft and engages a slot in the base of the socket member when the socket member is fully extended to engage the pin.

6. A drill as claimed in claim 4 in which a spring-loaded ball bearing detent is provided in a recess in the base of the socket so as to engage said one shaft and cooperate with a recess therein to define a retracted position for the socket member free of the pin.

7. A drill as claimed in claim 1 in which the slotted member is carried by said other shaft further from the drive mechanism.

8. A drill as claimed in claim 1 in which the seed dispensing units are such that their feed rate is varied by axial adjustment of the drive shaft driving them manual adjustment means being provided to vary the axial position of the drive shafts.

* * * * *